A. G. TRAUTMAN.
VEHICLE WHEEL AND TIRE.
APPLICATION FILED JAN. 26, 1917.
1,240,630.
Patented Sept. 18, 1917.
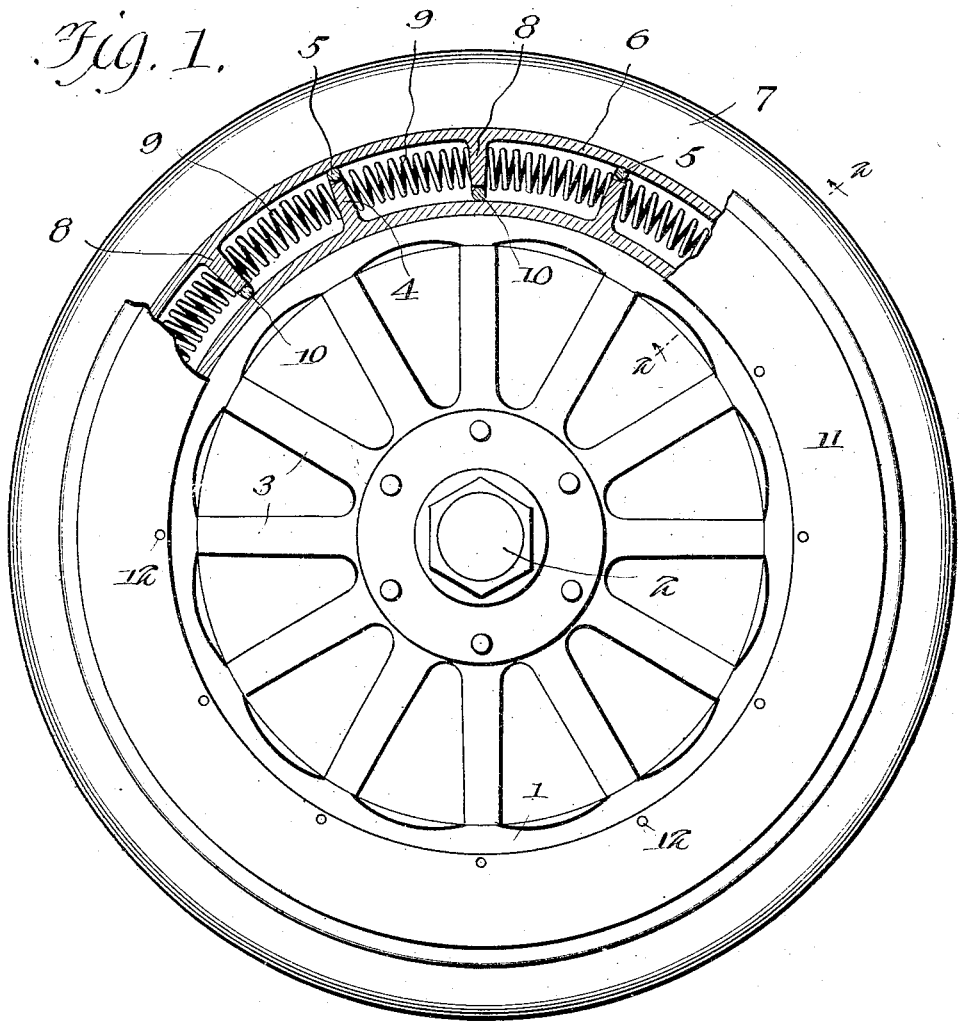
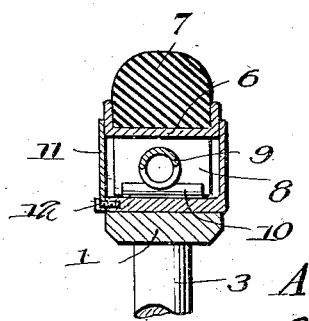
WITNESSES
A. V. Doyle
Hugh H. Ott
INVENTOR
August G. Trautman,
BY Victor J. Evans
ATTORNEY

UNITED STATES PATENT OFFICE.

AUGUST G. TRAUTMAN, OF NEW YORK, N. Y.

VEHICLE WHEEL AND TIRE.

1,240,630.

Specification of Letters Patent.

Patented Sept. 18, 1917.

Application filed January 26, 1917. Serial No. 144,714.

*To all whom it may concern:*

Be it known that I, AUGUST G. TRAUTMAN, a citizen of the United States, residing at New York, in the county of New York and State of New York, have invented new and useful Improvements in Vehicle Wheels and Tires, of which the following is a specification.

This invention relates to vehicle wheels, and has for its principal object the provision of a structure of this character which will include a rim provided with cushioning means, a companion felly located within the rim, and elastic devices interposed between the felly and the rim and serving to permit the rim to move circumferentially for a slight distance on the application of strain, shocks and jars, which are taken into the wheel at a tangent to the tread surface thereof, whereby the structure is possessed of a high degree of elasticity and buoyancy.

With the above and other objects in view which will appear as the nature of the invention is better understood, the same consists in the improved construction and novel arrangements of parts which will hereinafter be fully described and particularly pointed out in the claims.

In the accompanying drawings, has been illustrated, a single and preferred form of the invention, it being, however, understood that no limitations are necessarily made to the precise structural details therein exhibited, but that changes, alterations and modifications within the scope of the claims may be resorted to when desired.

In the drawings:—

Figure 1 is a side elevation with parts broken away.

Fig. 2 is a section on line 2—2, of Fig. 1.

The invention comprises a felly 1, a hub 2, and radial spokes 3, the latter connecting the felly with said hub as clearly shown. Extending from the periphery of the felly are rigid brackets 4, which carry revolving rollers 5, or similar anti-friction bodies.

The rim 6, is adapted to be placed on to the felly by sidewise movement when assembling the parts and as shown, it is provided with a cushion tire 7, and a series of fixed brackets 8, which are similar in construction to the brackets 4, on said felly. They are adapted to come between said brackets 4, and as illustrated, coiled springs 9, are interposed between the brackets of said felly and the brackets of the rim so as to hold the same relatively separated at equi-distant points normally.

The brackets 8, on the rim are provided with rollers 10, or anti-friction bodies which are similar to the rollers 5. When the rim and felly are in operative position, the rollers on the brackets 8, freely contact with the periphery of the felly, while the rollers 5, on the brackets 4, contact with the inner surface of the rim. In this manner, means are provided whereby the load which is supported by the wheel, will be always directly sustained by a plurality of the brackets 4 and 8.

It will be seen that the springs 9, when combined with the cushion tire 7, constitute means having a high extent of efficiency so that the wheel will be responsive to the many shocks and jars which are transmitted thereto and serve as a practical substitute for pneumatic tires.

In order to conceal the spring mechanism between the rim and felly, I provide housing plates 11, which are secured at 12, to the felly as best shown in Fig. 2. This prevents the elements from reaching the metallic parts of the structure while also serving as means for preventing any undue side movements of the rim upon the felly.

In operation, the tire 7, is designed to receive all ordinary shocks and jars, while the springs 9, operate to receive the severe shocks and jars and to permit the rim to move circumferentially for a slight distance.

What is claimed as new is:—

1. A vehicle wheel comprising a felly, a rim surrounding and spaced from the same, brackets on each element projecting toward the other and alternated with brackets on the latter, anti-friction devices at the outer ends of all brackets, and expansive springs between the several brackets, substantially as described.

2. A vehicle wheel comprising a felly, a rim surrounding and spaced from the same, brackets on each element projecting toward the other and alternated with brackets on the latter; anti-friction devices at the outer ends of all brackets, expansive springs loosely mounted between said elements and with their ends against respective brackets, and a housing carried by the felly and inclosing said springs and brackets and extending loosely over the edges of the rim, substantially as described.

3. A vehicle wheel comprising, a felly, a rim embracing the same and adapted to move circumferentially thereof, a cushion tire embracing the rim, devices on the rim, devices on the felly, springs interposed between the devices on said rim and the devices on said felly, all of said devices contributing with each other functionally to hold the felly equi-distantly spaced from the rim at all times and to sustain the load which is supported upon the wheel, all of said devices having anti-friction bodies, the bodies on the devices carried by the felly being arranged to freely travel the rim and the bodies on the devices of said rim serving to freely travel over the felly.

In testimony whereof I, affix my signature.

AUGUST G. TRAUTMAN.

Copies of this patent may be obtained for five cents each, by addressing the "Commissioner of Patents, Washington, D. C."